United States Patent [19]

Ishii et al.

[11] Patent Number: 4,669,438

[45] Date of Patent: Jun. 2, 1987

[54] IGNITION TIMING CONTROL SYSTEM FOR TWO-CYCLE INTERNAL COMBUSTION ENGINES

[75] Inventors: Norihisa Ishii, Sakado; Sumitaka Ogawa, Ohmiya, both of Japan

[73] Assignee: Honda Giken Kogyo Kabushiki Kaisha, Tokyo, Japan

[21] Appl. No.: 790,352

[22] Filed: Oct. 23, 1985

[30] Foreign Application Priority Data

Oct. 23, 1984 [JP] Japan .................. 59-221163

[51] Int. Cl.⁴ .............................. F02P 5/145
[52] U.S. Cl. .................... 123/418; 123/427
[58] Field of Search ............ 123/418, 427, 415, 602

[56] References Cited

U.S. PATENT DOCUMENTS

| | | | |
|---|---|---|---|
| 4,201,163 | 5/1980 | Hattori et al. | 123/418 |
| 4,385,617 | 5/1983 | Nakata et al. | 123/418 |
| 4,473,050 | 9/1984 | Kondo et al. | 123/427 |
| 4,503,823 | 3/1985 | Shibukawa et al. | 123/418 |

FOREIGN PATENT DOCUMENTS

57-210165 12/1982 Japan ............................. 123/418

*Primary Examiner*—Andrew Dolinar
*Attorney, Agent, or Firm*—Lyon & Lyon

[57] ABSTRACT

An ignition timing control system for a two-cycle internal combustion engine compares a first reference signal which rises to a predetermined level as a first pulse signal is generated corresponding to a predetermined crank angle and which thereafter decays at a predetermined slope, and a second reference signal of generally trapezoidal shape and having a pulse width corresponding to the pulse width of a second pulse signal corresponding to a predetermined crank angle. When the signal level of the second reference signal rises above that of the first reference signal, an ignition signal is generated. A first reference signal control circuit generates a triangular signal in synchronism with the second pulse signal, which triangular signal rises at a predetermined slope, and controls the first reference signal in such a manner that the first reference signal decays at a slope gentler than the predetermined slope from an instant in time at which the signal level of the triangular signal exceeds a predetermined level.

5 Claims, 9 Drawing Figures

IGNITION TIMING CONTROL SYSTEM FOR TWO-CYCLE INTERNAL COMBUSTION ENGINES

BACKGROUND OF THE INVENTION

This invention relates to an ignition timing control system of the type that employs a capacitative-discharge ignition unit (commonly referred to as a C.D.I unit) for use in internal combustion engines.

In general, a rise in the rotational speed of a two-cycle engine causes the mixture introduced into an engine cylinders to develop intake inertia. When an exhaust port opens under such a condition, the efficiency at which the mixture is charged into the cylinder apparently rises, thus elevating the cylinder internal pressure, owing to the effect that the cylinder internal pressure and the reflected exhaust wave resonate. Engine power can be improved if the ignition timing is controlled so as lag by a predetermined angle in relation to the rise in internal cylinder pressure so that firing occurs at the instant the cylinder internal pressure assumes a peak value.

In order to improve the power characteristic in an intermediate range of engine speeds in a two-cycle engine wherein greater engine power at high engine speed is achieved by delaying the ignition timing, it is effective to modify the shape and/or dimensions of the engine expansion chamber, as by being increased in length. However, the increase in length can cause the resonance point of reflected exhaust wave internally of the expansion chamber to shift toward the low engine rpm side. As a result, a satisfactory mixture charging efficiency can no longer be obtained at high engine speed, thus diminishing engine power at high rpm. Since the conventional ignition timing control system for two-cycle engines has but a simple delay angle characteristic, compensation for this decline in engine power at high engine speed cannot be achieved.

SUMMARY OF THE INVENTION

It is therefore the object of the invention to provide an ignition control system which is capable of raising engine power at high engine speed in a two-cycle internal combustion engine of the type equipped with an expansion chamber elongated for improved engine power at low and intermediate engine speeds.

According to the present invention, the foregoing object is attained by providing an improvement in an ignition timing control system for a two-cycle internal combustion engine having a pulse signal generating circuit for generating first and second pulse signals each corresponding to a predetermined crank angle; a first reference signal generating circuit connected to the pulse signal generating circuit for generating a first reference signal which rises to a predetermined level as the first pulse signal is generated, and which thereafter decays at a predetermined slope; a second reference signal generating circuit connected to the pulse signal generating circuit for generating a second reference signal of generally trapezoidal shape and having a pulse width corresponding to the pulse width of the second pulse signal; and an ignition timing determination circuit for comparing the first and second reference signals and for generating an ignition signal commanding an igniting action when a signal level of the second reference signal rises above a signal level of the first reference signal. The improvement comprises a first reference signal control circuit connected between the first reference signal generating circuit and the ignition timing determination circuit for generating a triangular signal in synchronism with the second pulse signal, which triangular signal rises at a predetermined slope, and for controlling the first reference signal in a manner such that the first reference signal decays at a slope gentler than the predetermined slope from an instant in time at which a signal level of the triangular signal exceeds a predetermined level.

The first reference signal control circuit comprises a series circuit including a resistor and capacitor connected between ground and a power supply, the capacitor being charged by the power supply at a predetermined time constant for producing the triangular signal; comparison means which receives the triangular signal from the capacitor for comparing the signal level of the triangular signal with the predetermined level, and for producing an output signal when the signal level of the triangular signal exceeds the predetermined level; and control means which receives the first reference signal from the first reference signal generating circuit for controlling the first reference signal in response to the output signal from the comparison means.

The first reference signal control circuit functions to produce a steeper delay angle characteristic when the engine speed attains predetermined high rpm. At high engine speed, therefore, the temperature of the exhaust gas rises sharply, so that the temperature inside the expansion chamber (exhaust tube) rises and sonic velocity increases. The effect is the same as that which would be obtained by shortening the length of the expansion chamber by an equivalent amount. Accordingly, even if the engine has an expansion chamber of comparatively great length to obtain a good power characteristic at low and intermediate speeds, it is still possible to obtain at high engine speed a high engine power equivalent to that which would be provided by an engine equipped with a high-speed type expansion chamber.

The above and other objects, features and advantages of the invention will be more apparent from the ensuing detailed description taken in connection with the accompanying drawings.

DETAILED DESCRIPTION

Before describing an embodiment of the present invention in detail, a conventional ignition timing control system for a two-cycle internal combustion engine will be discussed with reference to FIGS. 1 through 4 in order to further clarify the drawback encountered in the prior art.

Figure 1:
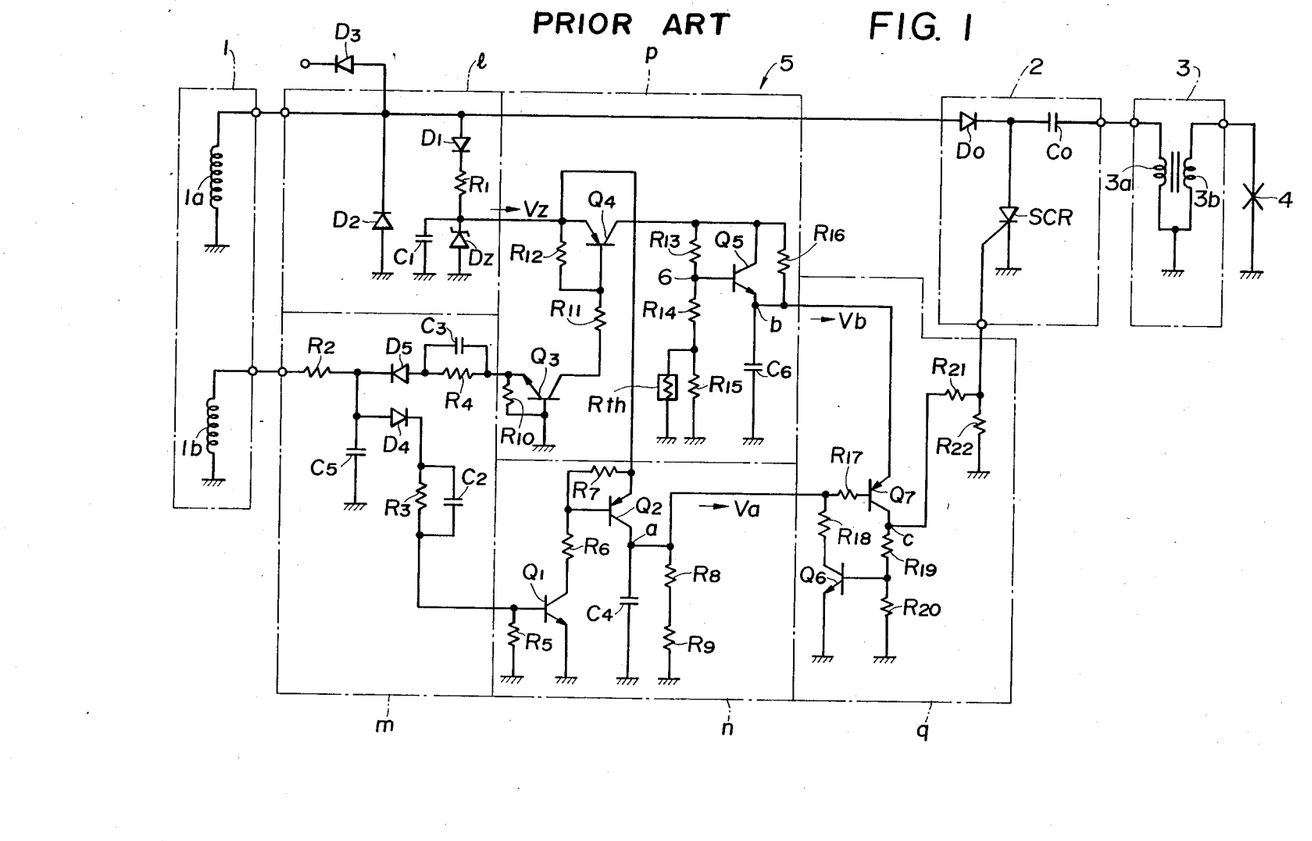
FIG. 1 is a circuit diagram illustrating a conventional ignition timing control system for an internal combustion engine.

As shown in FIG. 1, the conventional system includes a generator 1 having an exciter coil 1a and a pulser coil 1b. The ungrounded end of the exciter coil 1a is connected to a main circuit 2 for producing a high-voltage energy. The main circuit 2 includes a diode Do for rectifying the output of the exciter coil 1a, a capacitor Co charged by the rectified output of the diode Do, and a thyristor SCR connected to the junction of the diode Do and capacitor Co for controlling the discharge of the capacitor Co. The output side of the capacitor Co, which serves as the output terminal of the main circuit 2, is connected to a primary coil 3a which, in combination with a secondary coil 3b, forms an ignition coil 3. The ungrounded side of the secondary coil 3b is connected to a spark plug 4. An ignition timing control circuit 5, which serves as a delay angle circuit, is arranged between the pulser coil 1b of the generator 1 and the thyristor SCR of main circuit 2.

Figure 2:
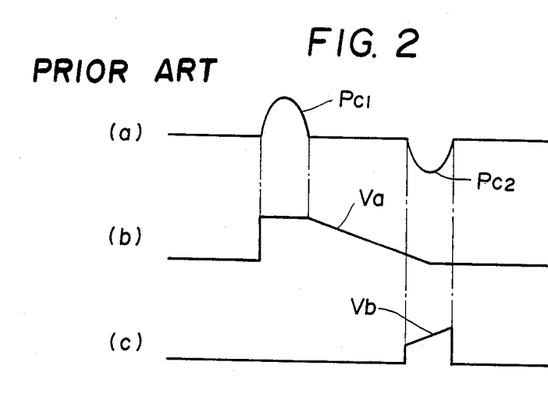
FIG. 2 is a timing chart illustrating the operation of the ignition timing control system shown in FIG. 1.

If considered in terms of function, the ignition timing control circuit 5 comprises a number of circuit blocks, specifically a power supply circuit l, a pulse signal generating circuit m for producing a first (positive) which corresponds to a predetermined crank angle of the engine crankshaft, and a second (negative) pulse signal which is delayed by a predetermined crank angle with respect to the first signal, a first reference signal generating circuit n for generating a first reference signal Va [described later in conjunction with FIG. 2(b)] which rises to a predetermined level as the first pulse signal is generated, and which thereafter decays at a predetermined slope, a second reference signal generating circuit p for generating a second reference signal Vb [described later in conjunction with FIG. 2(c)] of generally trapezoidal shape and having a pulse width corresponding to the pulse width of the second pulse signal, and an ignition timing determination circuit q having a transistor Q7 for comparison purposes and adapted to compare the first and second reference signals and generate an ignition signal when the levels of the second reference signal exceeds the level of the first reference signal (i.e., when the levels cross).

The specific construction and operation of the circuit blocks l through q will now be described with reference to FIGS. 2, 3 and 4.

When the engine is started and the generator 1 begins rotating, the exciter coil 1a and pulser coil 1b each develop a voltage. The exciter coil 1a produces an output current which charges the capacitor Co in main circuit 2. Concurrently, a capacitor C1 in the power supply circuit 1 is charged to a voltage Vz regulated by a zener diode DZ. The pulser coil 1b generates a first pulse signal Pc1, shown in FIG. 2(a), in response to which a diode D4 in the pulse generating circuit m produces a first pulse signal Pc1' delivered to a transistor Q1 in the first reference signal generating circuit n. The transistor Q1 is driven into conduction, or turned on, thereby turning on a transistor Q2. As a result, a capacitor C4 connected between ground and the collector of transistor Q2 is charged to a voltage approximately equivalent to the voltage Vz with the generation of the first pulse signal. After the first pulse signal vanishes, the capacitor C4 discharges in accordance with a predetermined time constant decided by C4 and resistors R8, R9. This circuit operation produces the first reference signal Va, shown in FIG. 2(b), at a point a located at the junction between the capacitor C4 and the collector of transistor Q2. The waveform of signal Va does not vary despite changes in engine rotational speed.

When the pulser coil 1b generates a second pulse signal Pc2 [FIG. 2(a)] following generation of the first pulse Pc1, a diode D5 in the pulse generating circuit m produces a second pulse signal Pc2' delivered to a transistor Q3 in the second reference signal generating circuit p. The transistor Q3 is turned on in response thereto, thereby driving transistors Q4, Q5 into conduction. As a result, a capacitor C6 connected between ground and the emitter of transistor Q5 in circuit p is instantly charged to the potential of a voltage dividing point 6 with the generation of the second pulse signal Pc2. Then, the transistor Q5 turns off, after which the capacitor C6 is gradually charged to a voltage approximately equivalent the voltage Vz through a resistor R16. This circuit operation produces the second reference signal Vb, shown in FIG. 2(c), at a point b located at the junction between the capacitor C6 and the emitter of transistor Q5. The pulse generating circuit m includes a noise preventing circuit composed of a resistor R3 and a capacitor C2 connected in parallel between the diode D5 and the transistor Q3, and a noise preventing circuit composed of a resistor R4 and a capacitor C3 connected in parallel between the diode D4 and the transistor Q1.

The ignition timing determination circuit q includes a transistor Q7 for comparing the signal levels of the first and second reference signals Va, Vb, respectively. When the result of the comparison is that the signal level of the second reference signal Vb exceeds that of the first reference signal Va, the transistor Q7 is turned on to produce an ignition signal at a point c connected to the collector of the transistor. The ignition signal drives the thyristor SCR into conduction, as a result of which the charge in capacitor Co is discharged through the thyristor SCR to produce a large current flow into the primary coil 3a of ignition coil 3. This in turn generates a high voltage in the secondary coil 3b to ignite the spark plug 4.

Figure 3:
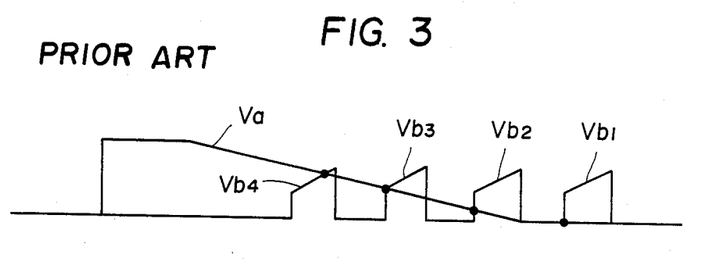
FIG. 3 is a timing chart illustrating the ignition timing delaying action of the ignition timing control system of FIG. 1.
Figure 4:
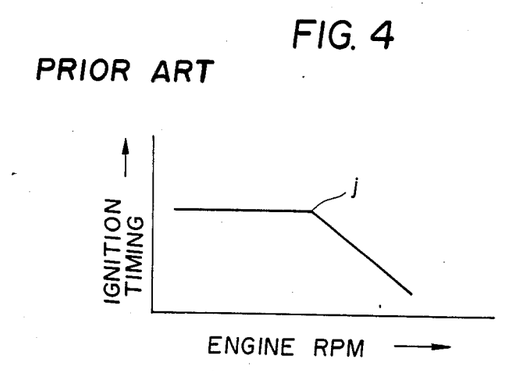
FIG. 4 shows a delay angle characteristic of ignition timing with respect to engine rpm in the conventional system.

The relationship between the ignition timing and engine rpm may be understood from FIGS. 3 and 4. As the engine speed rises, the interval between the first pulse Pc1 and second pulse Pc2 gradually narrows so that the second reference signal Vb is generated at a successively earlier timing. This is depicted in FIG. 3, which shows that, with increasing engine rpm, the occurrence of the second reference signal Vb is gradually shifted leftward or closer to the timing at which the first reference signal Va is produced. Over the ordinary range of engine rpm, the second reference signal is generated at a timing such as indicated at Vb1, Vb2 in FIG. 3, and ignition timing within this range of engine rpm is held at a constant crank angle position. When the engine speed attains predetermined high rpm, the ignition timing is retarded in accordance with a predetermined delay angle characteristic (single stage delay angle characteristic) from the beginning j (FIG. 4) of delayed angle operation at the timing, indicated at Vb3 in FIG. 3, at which the second reference signal is generated. The purpose here is to produce a greater engine power at high rpm.

In a two-cycle engine where an increase in engine power is achieved by retarding ignition timing in the above manner, an improvement in the power characteristic in the low and intermediate region of engine speeds is obtained by adjusting the shape and/or dimensions of the engine expansion chamber, as by lengthening the chamber. When this is done, however, the resonance point of the reflected exhaust wave inside the expansion chamber is shifted toward the low-speed side, so that a satisfactory mixture charging efficiency at high engine speed is no longer obtained, thus resulting in a lower engine power at high rpm. This cannot be compensated for with the conventional ignition timing control system owing to its single stage delay angle characteristic.

The present invention seeks to solve the foregoing problem and will now be described in connection with a preferred embodiment thereof with reference to FIGS. 5 through 9. Note that circuit elements in FIG. 5 identical with or equivalent to those shown in FIG. 1 are designated by like reference numerals, description of which is omitted.

Figure 5:
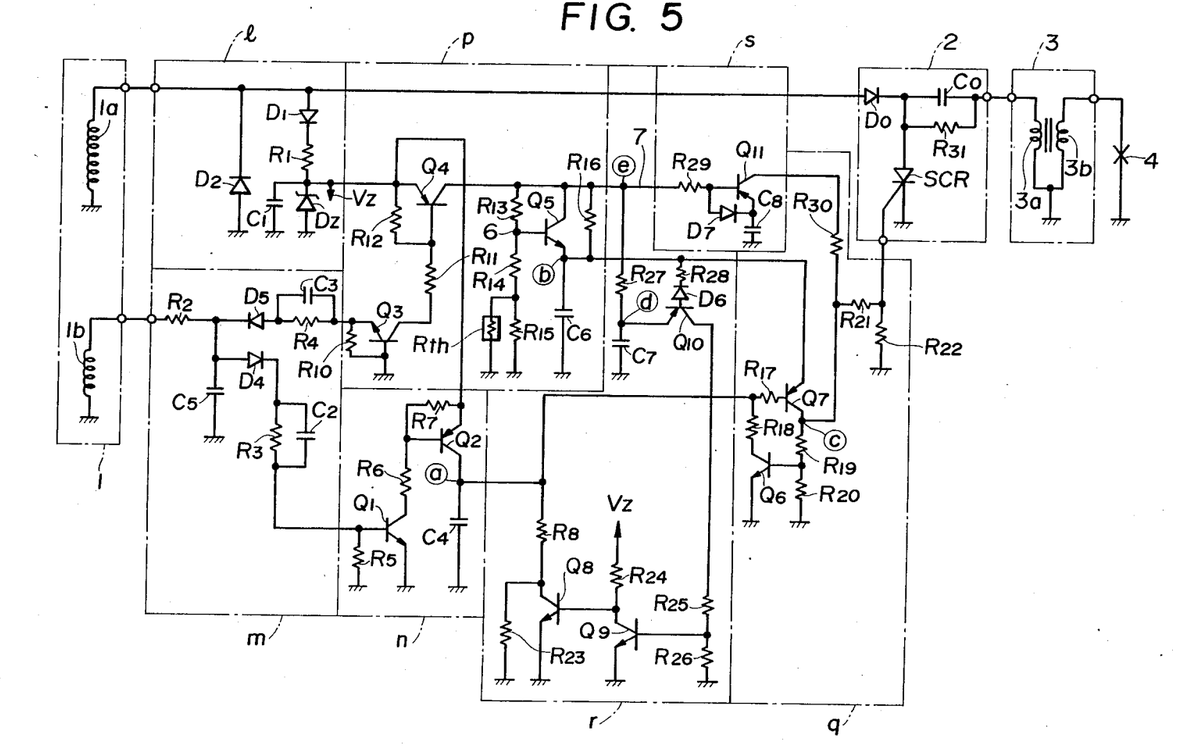
FIG. 5 is a circuit diagram illustrating an embodiment of an ignition timing control system for an internal combustion engine in accordance with the present invention.

As shown in FIG. 5 illustrating a preferred embodiment of an ignition timing control system according to the present invention, a control circuit r for controlling the first reference signal is arranged between the first reference signal generating circuit n and the ignition timing determination circuit q. The first reference signal control circuit r includes a transistor Q8 and a resistor 23 connected in a parallel circuit that replaces the resistor R9 in the first reference signal generating circuit n, used in the conventional system of FIG. 1. The transistor Q8 has a base terminal connected to the power supply circuit 1 through a resistor R24 and to ground through a transistor Q9. The transistors Q8, Q9 are junction transistors of the same type and are arranged so that transistor Q8 is maintained in the conductive state when transistor Q9 is non-conductive. The control circuit r further includes a series circuit, which is formed by a resistor R27 and a capacitor C7, connected between ground and a line 7 connected to the power supply circuit 1 through the transistor Q4. A junction d between the resistor R27 and capacitor C7 is connected to ground via a transistor Q10, a resistor R25 and a resistor R26. The junction between the resistors R25, R26 is connected to the base terminal of the transistor Q9. The transistor Q10 has a base terminal connected to the output point b of the second reference signal generating circuit p through a forwardly connected diode D6 and a resistor R28.

An ignition signal generating circuit s for generating an ignition signal at the time of maximum delay angle is arranged between the power supply line 7 and ignition signal output terminal c in the ignition timing determination circuit q. The ignition signal generating circuit s includes a transistor Q11 having a base terminal connected to the power supply line 7 through a resistor R29, an emitter terminal connected to ground through a capacitor C8, and a collector terminal connected to the ignition signal output terminal c through a resistor R30.

The operation of the preferred embodiment shown in FIG. 5 will now be described with reference to FIGS. 6 through 9.

Figure 6:
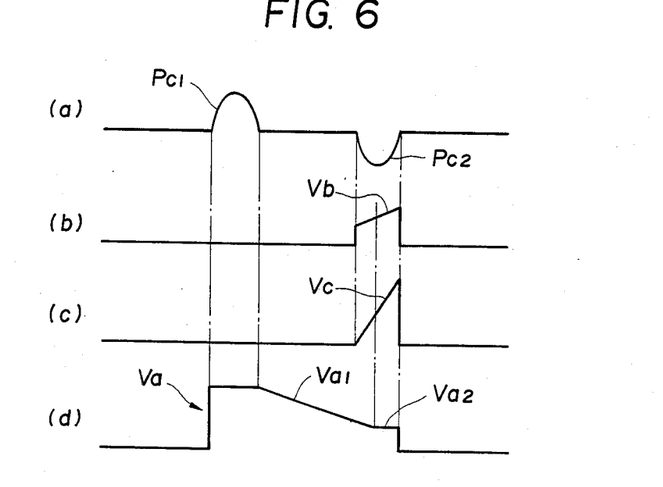
FIG. 6 is a timing chart illustrating the operation of the embodiment of FIG. 5.

When the engine is started and the generator 1 begins rotating, the exciter coil 1a produces an output current which charges the capacitor Co in main circuit 2. Concurrently, the capacitor C1 in the power supply circuit 1 is charged to a voltage Vz regulated by a zener diode DZ. The pulser coil 1b applies the first pulse signal Pc1 to the pulse generating circuit m, and the diode D4 applies the signal to the transistor Q1 in the first reference signal generating circuit n, whereby the transistors Q1, Q2 are both driven into conduction. As a result, the capacitor C4 is charged to the level of the power supply voltage Vz. The potential to which the capacitor C4 is charged is held at the level of the supply voltage Vz during the application of the first pulse signal Pc1 to transistor Q1. Meanwhile, the transistor Q4 arranged in the power supply line 7 is in the cut-off state during the generation of the first pulse signal Pc1. Accordingly, the transistor Q10 is held in the cut-off state and, hence, so is the transistor Q9, so that the transistor Q8 is turned on by the supply voltage Vz supplied through the resistor R24. In consequence, the voltage charged in the capacitor C4 is discharged at a gentle slope through the resistor R8 and transistor Q8 in accordance with a discharge time constant decided by the values of the capacitor C4 and resistor R8. The potential produced at the point a by this discharge of the capacitor C4 corresponds to the region Va1 of the first reference signal Va, as shown in FIG. 6(d).

Next, when the pulser coil 1b applies the second pulse signal Pc2 to the pulse generating circuit m, the diode D5 applies the signal to the second reference signal generating circuit p, thereby turning on the transistors Q3, Q4, Q5 and, hence, resulting in the generally trapezoidal second reference signal Vb at the output terminal b, as described above. This signal is illustrated in FIG. 6(b). During the conduction of transistor Q4 in response to application of the second reference signal Vb, the capacitor C7 is charged to the power supply voltage Vz in accordance with a charging time constant decided by the capacitor C7 and resistor R27, thus producing a pulse signal Vc having a triangular waveform, as shown in FIG. 6(c), at the point d, which is at the junction of C7 and R27 connected to the emitter of transistor Q10. The transistor Q10 compares the level of this triangular signal Vc and the level of the second reference signal Vb, which is applied from point b to the base of the transistor Q10 through the resistor R28 and diode D6, and is turned on at the instant that the level of the triangular signal Vc exceeds that of the second reference signal Vb. Driving the transistor Q10 into conduction causes a predetermined biasing voltage to be applied to the base terminal of the transistor Q9, thereby turning this transistor on and turning transistor Q8 off. Consequently, at the instant the level of the triangular signal Vc surpasses that of the second reference signal Vb, the discharge path of capacitor C4 changes over from the series circuit of resistor R8 and transistor Q8 to the series circuit consisting of resistor R8 and resistor R23. It should be noted that the resistor R23 used has a large resistance value in order to set a fairly large discharge time constant. Accordingly, at the moment the discharge path of capacitor C4 is switched as described above, the first reference signal Va decays at a gentler slope than that of the region Va1, as shown at region Va2 in FIG. 6(d). In other words, the first reference signal Va has a waveform which decays at a certain slope until an instant, at which point the signal begins decaying at a gentler slope. The transistor Q7 compares the level of the first reference signal Va having this waveform with the level of the second reference signal Vb. When the level of the latter exceeds that of the former, the transistor Q7 is rendered conductive to produce the ignition signal that turns on the thyristor SCR. This in turn causes the spark plug 4 to be ignited through the ignition coil 3, as described earlier. Note that the transistor Q6 also is turned on when transistor Q7 is rendered conductive, as a result of which point a is connected to ground to instantaneously send the first reference signal Va to ground potential.

Figure 7:
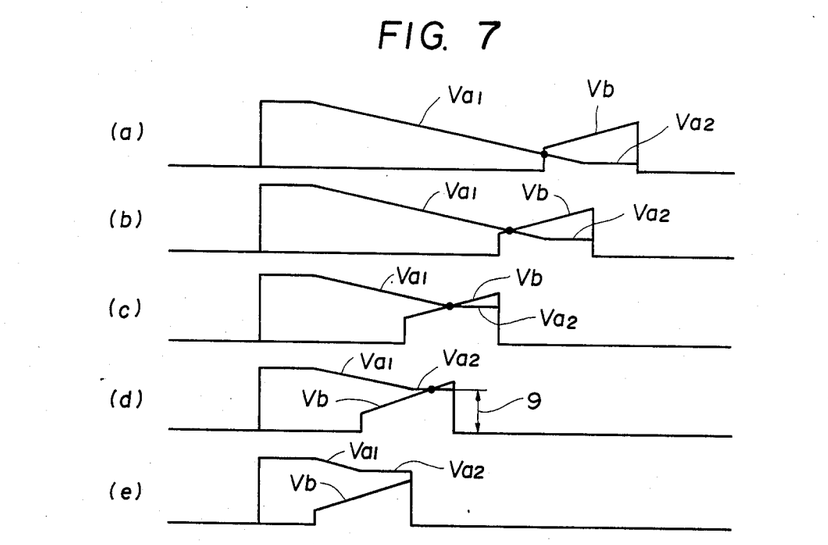
FIG. 7 is a timing chart illustrating the ignition timing delaying action in the embodiment of FIG. 5.
Figure 8:
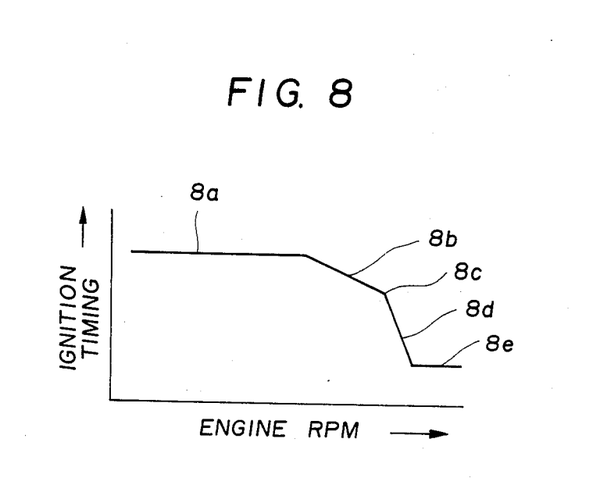
FIG. 8 is a graph showing a delay angle characteristic of ignition timing with respect to engine rpm in the embodiment of FIG. 5.

Now will be described two-stage delay action and an increase in engine power when the engine rotates at high speed. As the engine speed rises, the interval between generation of the first and second pulse signals Pc1, Pc2 narrows, so that the timing at which the second reference signal Vb is generated is shifted successively leftward, as shown in FIGS. 7(a) through 7(e). Note that the waveform of the second reference signal Vb itself does not change with a variation in engine rpm; only the timing at which the signal is generated varies, becoming progressively earlier as the engine speed rises. Further, in relation to the first reference signal Va, the slope of region Va1 does not change with respect to engine rpm; only the timing at which region Va1 makes the transition to the region Va2 of gentler slope changes, the transition also becoming processively earlier with the increase in engine rpm. Accordingly, the level 9 of region Va2 having the gentle slope rises as the engine rotates at higher speed. The level of the first reference signal Va, the waveform whereof is altered in the above-described manner, and the level of the second reference signal Vb are compared by the transistor Q7. Ignition timing is decided by the point at which the two signal levels cross, enabling the desired delay angle characteristic to be obtained.

More specifically, ignition timing is regulated in the following manner: At low engine speed, represented by FIG. 7(a), ignition timing is maintained at a constant crank angle position. This corresponds to region 8a in FIG. 8. Next, at a first stage delay angle, represented by FIG. 7(b), ignition timing is as indicated at region 8b in FIG. 8. The second stage of delay action begins at the instant [point 8c in FIG. 8) that the slope transition point of the first reference signal Va crosses the second reference signal Vb, as shown in FIG. 7(c). In other words, the corresponding engine rpm at the beginning of this second stage of delay operation is equivalent to a lower limit of high rpm at and above which the mixture is charged into the engine cylinders at a higher efficiency due to the effect of resonation of the cylinder internal pressure wave with the reflected exhaust gas wave, which is brought about by the influence of the inertia of intake air drawn into the cylinders, whereby the engine output is the greatest. Since the gently sloping region Va2 of the first reference signal Va and the second reference signal Vb cross from the beginning of the second stage of the delay operation, there is an increase in the rate at which the cross point of the signals Va, Vb rises with respect to the rate at which the engine speed increases, in other words, the rate at which the second reference signal Vb moves leftward in FIG. 7. As a result, the delay angle characteristic falls sharply so that as shown at 8d in FIG. 8. Thus, at high engine speed, the temperature of the exhaust gas rises sharply, so that the temperature inside the expansion chamber rises and sonic velocity increases. The effect is the same as that which would be obtained by shortening the length of the expansion chamber by an equivalent amount. Accordingly, if the engine is equipped with an expansion chamber of comparatively great length to obtain a good power characteristic at low and intermediate speeds, increased engine power can be achieved not only in the low and intermediate speed regions but also in the region of high engine rpm.

Figure 9:
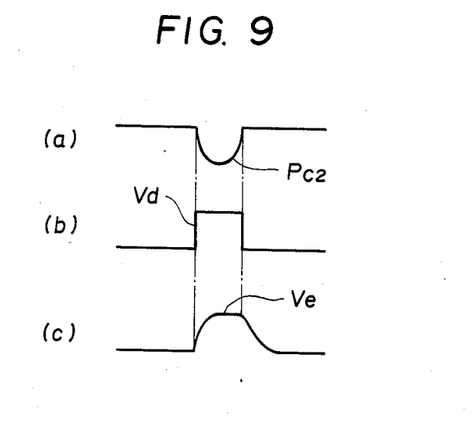
FIG. 9 is a timing chart illustrating the operation of an ignition signal generating circuit in the embodiment of FIG. 5.

When the signal level of the first reference signal Va surpasses that of the second reference signal Vb, as shown in FIG. 7(e), during this delay angle action based upon the comparison between the first and second reference signals Va, Vb, respectively, the ignition signal thenceforth is not generated from the output point c of ignition timing determination circuit q. Accordingly, the ignition signal generating circuit s is now actuated to produce an ignition signal which prevails during maximum delay. More specifically, when the second pulse signal Pc2 is generated by the pulser coil 1b to turn on the transistor Q4, a square-wave signal Vd synchronized with the second pulse signal Pc2 appears at the point e in the ignition signal generating circuit s, as shown in FIG. 9(b). Meanwhile, the capacitor C8 is charged at a time constant decided primarily by the values of capacitor C8 and resistor R29, so that the capacitor C8 develops at its non-grounded terminal a signal Ve indicative of this charged voltage and having the waveform shown in FIG. 9(c). The square-wave signal Vd and the signal Ve are compared by the transistor Q11. As a result, a voltage equivalent to the discharge from capacitor C8 is applied across the emitter and base of transistor Q11 from the instant the square-wave signal Vd decays, so that the transistor Q11 is driven into conduction. The ignition signal generating circuit s thus produces an ignition signal that is applied to the thyristor SCR.

As many apparently widely different embodiments of the present invention can be made without departing from the spirit and scope thereof, it is to be understood that the invention is not limited to the specific embodiment thereof except as defined in the appended claims.

What is claimed is:

1. In an ignition timing control system for a two-cycle internal combustion engine having a pulse signal generating circuit for generating first and second pulse signals each corresponding to a predetermined crank angle; a first reference signal generating circuit connected to said pulse signal generating circuit for generating a first reference signal which rises to a predetermined level as the first pulse signal is generated, and which thereafter decays at a predetermined slope; a second reference signal generating circuit connected to said pulse signal generating circuit for generating a second reference signal of generally trapezoidal shape and having a pulse width corresponding to the pulse width of the second pulse signal; and an ignition timing determination circuit for comparing the first and second reference signals and for generating an ignition signal commanding an igniting action when a signal level of the second reference signal rises above a signal level of the first reference signal;

the improvement comprising a first reference signal control circuit connected between said first reference signal generating circuit and said ignition timing determination circuit for generating a triangular signal in synchronism with the second pulse signal, which triangular signal rises at a predetermined slope, and for controlling the first reference signal in a manner such that said first reference signal decays at a slope gentler than said predetermined slope from an instant in time at which a signal level of the triangular signal exceeds a predetermined level.

2. The improvement according to claim 1, wherein said predetermined level is a signal level of said second reference signal.

3. The improvement according to claim 1, wherein said first reference signal control circuit comprises:
   a series circuit including a resistor and capacitor connected between ground and a power supply, said capacitor being charged by the power supply at a predetermined time constant for producing the triangular signal;
   comparison means which receives the triangular signal from said capacitor for comparing the signal level of the triangular signal with said predetermined level, and for producing an output signal when the signal level of the triangular signal exceeds said predetermined level; and
   control means which receives the first reference signal from said first reference signal generating circuit for controlling said first reference signal in response to the output signal from said comparison means.

4. The improvement according to claim 2, wherein said comparison means comprises a transistor having an emitter connected to a junction between said resistor and said capacitor for receiving the triangular signal, a collector connected to said control means, and a base connected through a diode and resistor to an output terminal of said second reference signal generating circuit for receiving the second reference signal, said second reference signal having a signal level which serves as said predetermined level, said transistor being turned on to produce said output signal when the signal level of the triangular signal exceeds said predetermined level.

5. The improvement according to claim 2, wherein said control means comprises:
   a first transistor having a base connected to said comparison means for receiving the output signal, an emitter connected to ground and a collector connected to the power supply, said first transistor being driven into conduction by the output signal from said comparison means;
   a second transistor having a base connected to the collector of said first transistor, an emitter connected to ground, and a collector, said second transistor being turned off by conduction of said first transistor;
   a first resistor having one end connected to the output terminal of said first reference signal generating circuit and to an input side of said ignition timing determination circuit, and having another end connected to the collector of said second transistor, said first resistor being connected to ground through said second transistor when said second transistor is conductive, whereby said first reference signal decays at said predetermined slope; and
   a second resistor connected between ground and a junction between said first resistor and the collector of said second transistor;
   said first resistor being connected to ground through said second resistor when said second transistor is turned off, whereby the first reference signal decays at said gentler slope.

* * * * *